United States Patent [19]

Salvador et al.

[11] Patent Number: 5,560,680

[45] Date of Patent: Oct. 1, 1996

[54] CHILD CAR SEAT STRUCTURE

[76] Inventors: Daniel R. Salvador; Wayne J. Salvador, both of 460 D. St., Fremont, Calif. 94536

[21] Appl. No.: 493,656

[22] Filed: Jun. 22, 1995

[51] Int. Cl.⁶ .................................................. A47C 1/08
[52] U.S. Cl. ............... 297/256.15; 297/181; 297/188.14; 297/411.38; 297/488
[58] Field of Search ..................... 297/487, 488, 297/467, 250.1, 256.15, 411.32, 411.38, 188.14, 188.01, 181

[56] References Cited

U.S. PATENT DOCUMENTS

| | | | |
|---|---|---|---|
| D. 302,988 | 8/1989 | Zinter-Chahin | D21/63 |
| 1,390,502 | 9/1921 | Clouser | 297/467 X |
| 2,127,020 | 8/1938 | Carlson | 297/467 |
| 2,269,918 | 1/1942 | Sill | 297/411.32 |
| 2,774,411 | 12/1956 | Berlin | 297/467 X |
| 2,949,152 | 8/1960 | Hipps et al. | 297/467 X |
| 3,008,763 | 11/1961 | Lebow | 297/181 |
| 4,451,082 | 5/1984 | Giordani | 297/411.32 X |
| 4,594,072 | 6/1986 | Cowell | 446/227 |
| 4,650,246 | 3/1987 | Henriksson | 297/487 X |
| 4,722,713 | 2/1988 | Williams et al. | 446/227 |
| 4,865,380 | 9/1989 | Heitzman-Powell et al. | 297/184 |
| 4,875,732 | 10/1989 | Miller | 297/181 |
| 4,973,106 | 11/1990 | Strovinskas | 297/482 |
| 5,061,012 | 10/1991 | Parker et al. | 297/256.15 X |
| 5,076,520 | 12/1991 | Bro | 248/165 |
| 5,094,506 | 3/1992 | Costa | 297/184 |
| 5,147,109 | 9/1992 | Jolly | 297/217 |
| 5,317,765 | 6/1994 | Knoedler et al. | 297/467 X |
| 5,332,286 | 7/1994 | Atherton et al. | 297/188.14 X |

Primary Examiner—Milton Nelson, Jr.
Attorney, Agent, or Firm—Bielen, Peterson & Lampe

[57] ABSTRACT

A child car seat device utilizing a platform for contacting the vehicle seat. The platform includes a front portion and a rear portion. A backrest is connected to the platform rear portion while a body projects from the front portion of the platform. The projecting body includes a shaft extending into contact with the platform. An ornamental terminus is fixed to the shaft by a suitable fastener. The connected ornamental terminus permits the legs of the child to straddle the same while sitting on the platform.

6 Claims, 2 Drawing Sheets

CHILD CAR SEAT STRUCTURE

BACKGROUND OF THE INVENTION

The present invention relates to a novel and useful car seat device which is usable to support children in a vehicle.

Governmental safety standards require that children be securely fastened into special car seats that fit atop vehicle seats in a passenger car. The purpose of this regulation is to protect the child during vehicular travel, sudden stopping, and in traffic accident situations. Many child seat structures have been devised to achieve compliance with the regulations. In addition, children are normally unhappy at being confined within a vehicle and must be provided with some sort of entertainment means, in addition to being adequately held to a car seat structure.

Several toy supports have been devised for attachment to cribs, beds, infant seats, strollers, or the like. For example, U.S. Pat. Nos. 4,722,713; 5,076,520; and Des. U.S. Pat. No. 302,988 show bridging type members which are adaptable to infant car seats. Such bridging members usually include appending or supporting arms and platforms for toys.

U.S. Pat. Nos. 4,865,380 and 5,094,506 depict a child safety car seat that includes a windshield to protect the child during travel.

U.S. Pat. No. 5,147,109 illustrates a child car seat that includes a back pad in the form of a bear or stuffed animal.

U.S. Pat. No. 4,973,106 shows a seat belt attachment for a child placed in a car seat which takes the form of a teddy bear.

U.S. Pat. No. 4,594,072 illustrates a soft simulated auto dashboard which may be attached to a platform which fits over the lap of a child in a car seat.

A child car seat device which combines a seat and an ornamental toy would be a notable advance in the transportation field.

SUMMARY OF THE INVENTION

In accordance with the present invention a novel and useful child car seat device is herein provided.

The child car seat device of the present invention includes a platform which is formed to contact the vehicle seat. The platform includes a front portion and a rear portion. The rear portion is connected to a backrest which extends upwardly to support the back portion of the child. Such backrest may include side partitions or wings. The platform and backrest may be fastened to a vehicle car seat by a seat belt or other mechanism known in the art.

A body is also found in the present invention and projects from the front portion of the platform. The body includes a shaft which extends into contact with the platform and it has an ornamental terminus which is fixed to the shaft. Means is included for holding the shaft to the platform such that the ornamental terminus extends outwardly from the front portion of the platform serving as the seat of the child car support. The ornamental terminus is formed to permit the legs of the child to straddle the ornamental terminus and to permit the child to play with the ornamental terminus which may be formed as a toy in order to consume the child's attention during travel. The ornamental terminus may also be padded or formed, in whole or in part, of resilient material in case the vehicle suddenly stops and it is necessary to cushion the head of the child. Such scenario assumes the child would be thrown forward during such sudden stopping of the vehicle. In addition, the ornamental terminus and shaft is removable from the seat platform such that different termini may be fixed to the platform, permitting the child to straddle the terminus.

Moreover, rotatable arms may be connected to the side portions of the platform intermediate the front and back portions thereof. Such rotatable arms may include a recess on the end to permit storage of items usable in conjunction with the ornamental terminus.

Means for removably holding the shaft of the body to the platform may include a boss connected to the ornamental terminus. A housing connected to the first portion of the platform may provide an aperture for accepting the boss and holding the same thereto by friction, or other suitable fastening means.

In addition, the device of the present invention may include means for rotatably holding arms extending from the platform. Such means may include a rod passing through the first end portion of the platform and being fixed to one or more arms. The rod is rotatably held by the housing within the platform and stopped from rotation by a set screw which is threaded through the housing. The set screw frictionally contacts the exterior of the shaft to limit rotation.

It may be apparent that a novel and useful child car seat device has been described.

It is therefore an object of the present invention to provide a child car seat device which includes an ornamental portion which lies in a central location and permits the child to straddle the same.

It is another object of the present invention to provide a child car seat device which includes an ornamental terminus at the central portion of the car seat which is replaceable.

A further object of the present invention is to provide a child car seat device which includes an ornamental terminus which may be straddled by a child sitting in the car seat and includes rotatable arms which serve as storage areas for accessories used in conjunction with the ornamental terminus.

Yet another object of the present invention is to provide a child car seat device which improves the safety of the child occupying the same.

The invention possesses other objects and advantages especially as concerns particular characteristics and features thereof which will become apparent as the specification continues.

Figure 1:
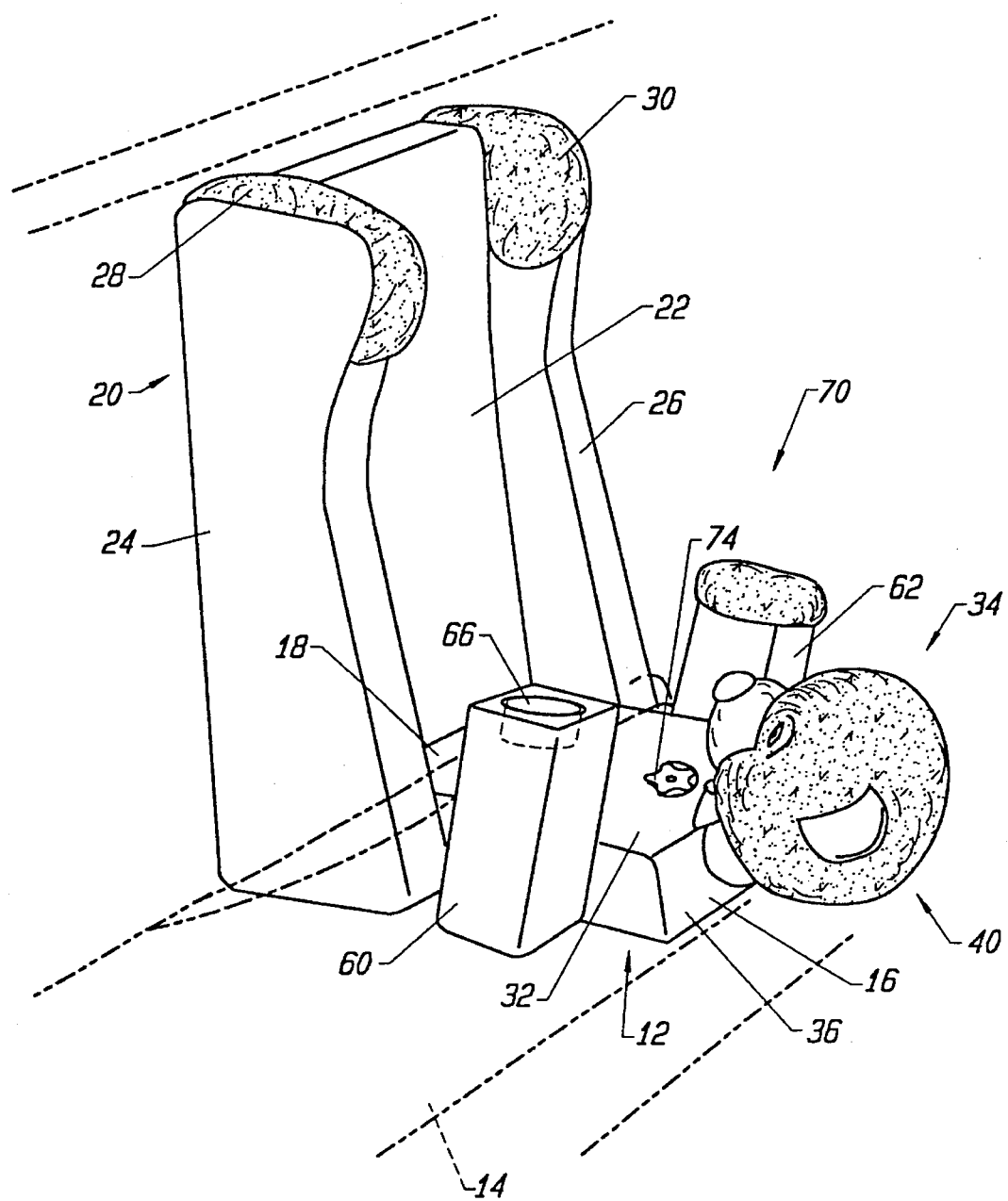
FIG. 1 is a top left front perspective view of the device of the present invention shown in a supportive environment relative to a car seat.

For a better understanding of the invention references made to the following detailed description of the preferred embodiments thereof which should be taken in conjunction with the hereinabove described drawings.

DETAILED DESCRIPTION OF THE PREFERRED EMBODIMENTS

Various aspects of the present invention will evolve from the following detailed description of the preferred embodiments thereof which should be referenced to the above described drawings.

The invention as a whole is shown in the drawings by reference character 10. The child car seat device 10 includes as one of its elements a platform 12 which is intended to contact the vehicle seat 14. Platform 12 may take the form of a cushion or other padded object and includes a first front portion 16 and a second rear portion 18. A backrest 20 is connected to the rear portion 18 of platform 12. Backrest 20 possesses a vertical back wall 22 and side wings 24 and 26. Ornamental padded areas 28 and 30 cap side wings 24 and 26, respectively. Needless to say, the user sits on upper surface 32 of platform 12 with the user's back resting against back wall 22 of back rest 20. Of course, seat belts found in vehicles may be used on conjunction with seat 10 in the conventional manner (not shown).

Figure 2A:
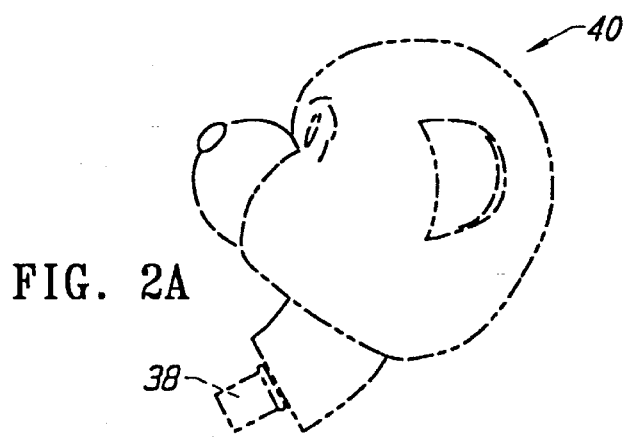
FIG. 2A is a side view of the ornamental terminus drawn in phantom.
Figure 2:
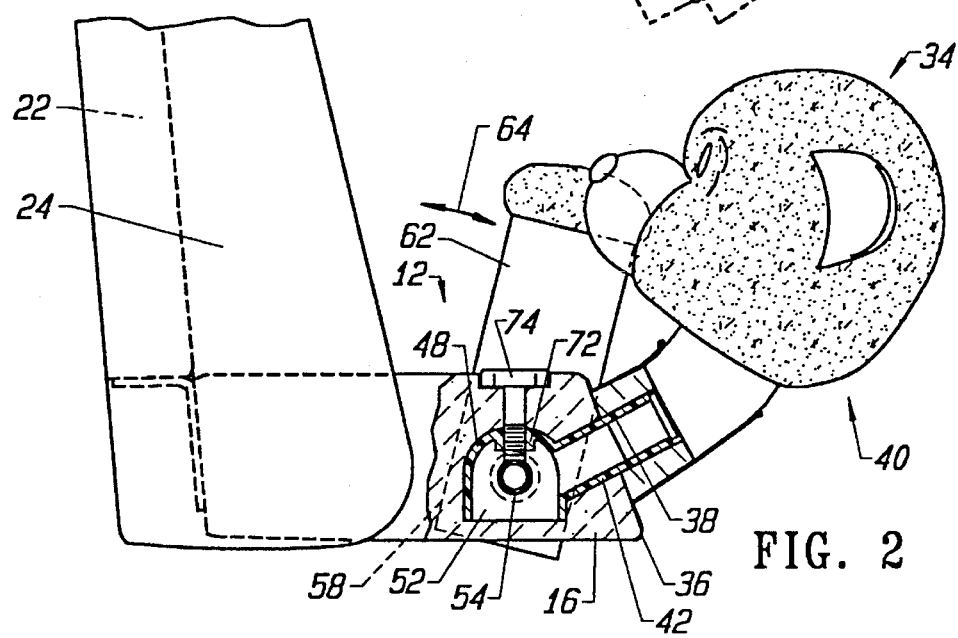
FIG. 2 is a side elevational view of the device of the present invention with a cut-away portion depicting the arm rotation and terminus support portions thereof.

Child seat 10 also includes as one of its elements a centralized body 34 which projects from end 36 of platform 12. With respect to FIGS. 2 and 2A, body 34 includes a shaft 38 which extends toward platform 12. Ornamental terminus 40 is fixed to shaft 38 and extends outwardly and slightly upwardly from platform 12. As depicted in the drawings, ornamental terminus 40 takes the form of a stuffed bear head, which is deemed to be attractive to a child occupying child seat 10. With reference to FIG. 2A it may be observed that shaft 38 frictionally fits within a tube or boss 42 extending from platform 12, whose structure will be more fully described hereinafter. Thus, ornamental terminus 40 is removable and replaceable with respect to platform 12. That is to say, other renditions other than that depicted in the drawings may be employed as an attractant to the child occupying seat 10.

Figure 3:
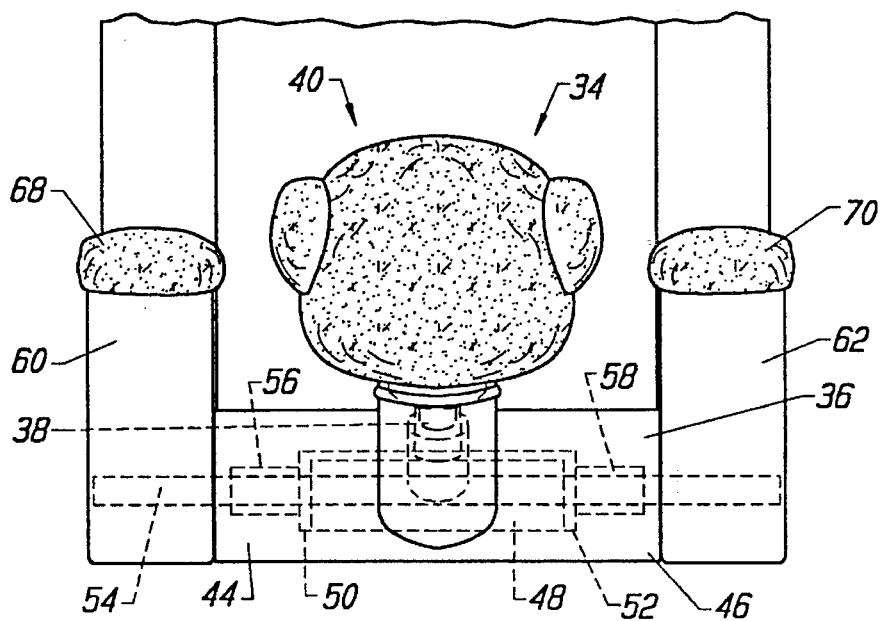
FIG. 3 is a front elevational view of the device of the present invention with the arm rotation and terminus support mechanisms shown in phantom.

With respect to FIG. 3, it may be seen that the legs of the child are designed to extend along areas 44 and 46 of end 36 of platform 12 when occupying seat 10. In other words, the transverse dimension of end 36 exceeds the transverse dimension of shaft 38 of end body 34.

Platform 12 is constructed to hold a curved housing 48 which is constructed of rigid plastic material. It should be noted, however, that housing 48 may be formed of any suitable material such as metal, wood, and the like. As heretofore noted, tube 42 is integrally formed with housing 48 and extends outwardly from housing 48 and end portion 36 of platform 12. In addition, end walls 50 and 52 of housing 48 include openings therethrough to rotatably support hollow rod 54. Guides 56 and 58 aid in the support of hollow rod 54, since guides 56 and 58 are fixed to the exterior surface of end walls 50 and 52. Arms 60 and 62 fixed to rotatable rod 54 and rotatably move according to directional arrow 64.

With reference again to FIG. 1, arms 60 and 62 may be each fitted as shown with respect to arm 60, with a recess 66 that may be employed to hold accessories, such as cups and any other items in the vicinity of ornamental terminus 40. Pads 68 and 70, FIG. 3, are removable to reveal recesses in arms 60 and 62 respectively.

Returning to FIGS. 2 and 3, it may be observed that housing 48 is fitted with a threaded bore 72 which threadingly engages threaded hand screw 74. Turning to FIG. 1, it may be seen that threaded hand screw 74 is accessible at the top surface 32 of platform 12. Threaded hand screw 74 serves as a stop to prevent the rotation of arms 60 and 62 and visa versa.

In operation, seat 10 would be placed on vehicle seat 14 in the orientation depicted in FIG. 1. The child would then sit on platform 12 and rest his or her back against wall 22 of backrest 20. The legs of the child would extend along side portions 44 and 46 of platform 12 such that central object 34 with ornamental terminus 40 lies between the legs of the child. In other words, the child would straddle object 34. In this position, the child is able to play with object 34 during travel of the vehicle. Object 34 and terminus 40 may be removable and replaceable with other items from the one depicted in the drawings. In any case, terminus 40 may be formed of resilient material to cushion the head of the child if a sudden stop occurs in the vehicle. Arms 60 and 62 may be rotated upwardly into position to serve as an arm rest by the use of pad 68 and 70, or to provide recesses such as recess 66 to hold items as desired.

While in the foregoing, embodiments of the present invention have been set forth in considerable detail for the purposes of making a complete disclosure of the invention, it may be apparent to those of skill in the art that numerous changes may be made in such details without departing from the spirit and principles of the invention.

What is claimed is:

1. A child car seat device intended for use with a vehicle seat comprising:

a. a platform intended for contacting the vehicle seat, said platform including a front portion and a rear portion;

b. a backrest connected to said platform rear portion;

c. a body projecting from said front portion of said platform, said body including a shaft extending toward said platform and an ornamental terminus fixed to said shaft, and means for removably holding said shaft to said platform, said ornamental terminus being formed to permit the legs of the child to straddle said ornamental terminus; and d. an arm extending from said platform intermediate, said front and rear portions thereof, and means for permitting rotation of said arm relative to said platform, said means for permitting rotation of said arm including an elongated member, a housing connected to said platform and supporting said elongated member, and a stop extending from said housing to engage said elongated member to preclude rotation thereof, said elongated member being connected to said arm, said housing further providing mounting means for said shaft of said body extending toward said platform.

2. The device of claim 1 in which said ornamental terminus is formed with resilient material.

3. The device of claim 1 in which said ornamental terminus possesses a transverse dimension larger than a transverse dimension of said shaft.

4. The device of claim 1 in which said arm includes a storage recess.

5. The device of claim 1 in which said elongated member connects to and extends from said housing.

6. The device of claim 1 in which said mounting means further comprises said housing having an aperture sized to fit over said shaft.

* * * * *